US006029580A

United States Patent [19]

Alfonso et al.

[11] Patent Number: 6,029,580
[45] Date of Patent: Feb. 29, 2000

[54] HANGING SUPPORT BASKET FOR COMPUTERS

[75] Inventors: Pedro Alfonso, Austin, Tex.; Bryan Byle, Canfield, Ohio

[73] Assignee: Dell USA, L.P., Round Rock, Tex.

[21] Appl. No.: 09/112,925

[22] Filed: Jul. 9, 1998

[51] Int. Cl.[7] .................................................. F16M 13/00
[52] U.S. Cl. ..................... 108/26; 108/50.02; 312/223.3; 248/552; 248/918
[58] Field of Search .................................. 248/552, 551, 248/553, 302, 918; 312/194, 195, 245, 223.3; 108/50.02, 26, 25; 70/58, 18; 211/106, 119, 4, 181.1

[56] References Cited

U.S. PATENT DOCUMENTS

| | | |
|---|---|---|
| D. 264,761 | 6/1982 | Dekarski . |
| 553,359 | 1/1896 | Pickett ............................. 211/181.1 X |
| 993,633 | 5/1911 | Ambrock ................................... 211/31 |
| 1,378,902 | 5/1921 | Roehl ................................. 211/106 X |
| 1,383,025 | 6/1921 | Reynolds ............................. 248/300 X |
| 1,741,928 | 12/1929 | Gafney ..................................... 211/106 |
| 1,800,646 | 4/1931 | Kottke ..................................... 211/106 |
| 3,002,797 | 10/1961 | Stark ........................................ 312/194 |
| 4,640,199 | 2/1987 | Zigman ............................. 312/223.3 X |
| 4,843,848 | 7/1989 | Igelmund .................................... 70/58 |
| 4,858,878 | 8/1989 | Gassaway ................................ 248/551 |
| 4,943,029 | 7/1990 | Szuster ..................................... 248/917 |
| 5,406,809 | 4/1995 | Igelmund ............................ 248/552 X |
| 5,685,236 | 11/1997 | Lechman ................................. 108/110 |
| 5,788,093 | 8/1998 | Krut ................................... 211/106 X |
| 5,897,179 | 4/1999 | Wade ............................... 108/50.02 X |

*Primary Examiner*—Ramon O. Ramirez
*Assistant Examiner*—Stephen S. Wentsler
*Attorney, Agent, or Firm*—Haynes & Boone, L.L.P.

[57] ABSTRACT

A computer user station includes a support member. A monitor and a keyboard are supported on a first surface of the support member. A computer chassis is mounted in a frame. The frame includes a mounting portion attached for mounting the computer chassis to a second surface of the support member in a suspended position. A security portion of the frame secures the frame to the computer chassis. The security portion also functions as a back support for a back surface of the computer chassis which is cradled in the frame in a tilted-back position.

13 Claims, 6 Drawing Sheets

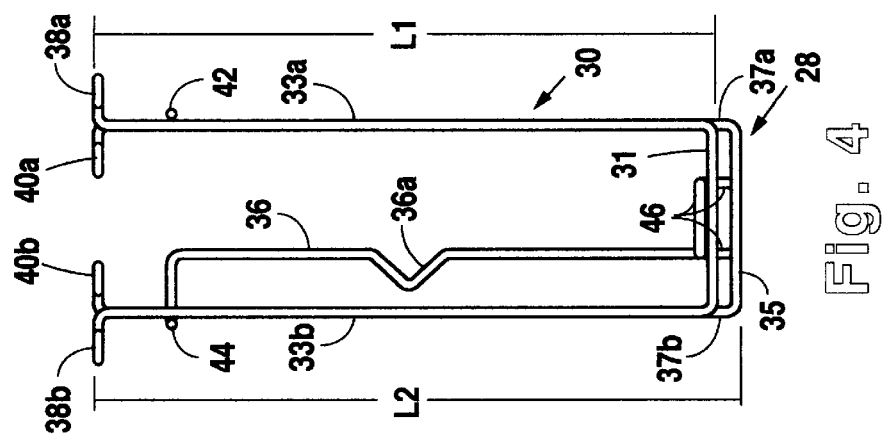
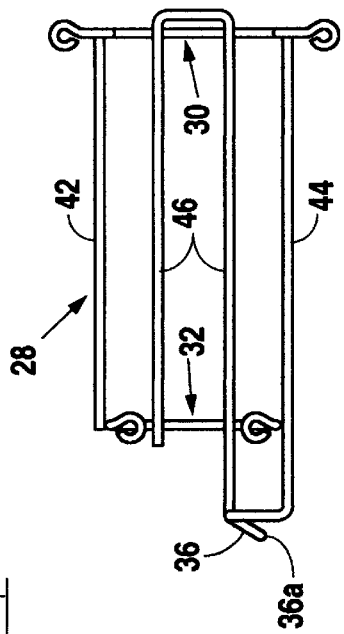
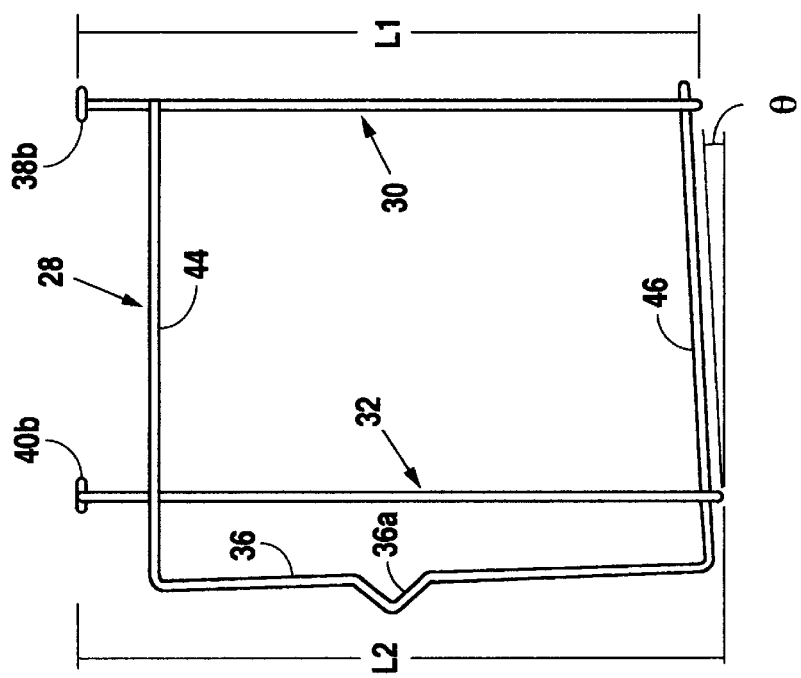

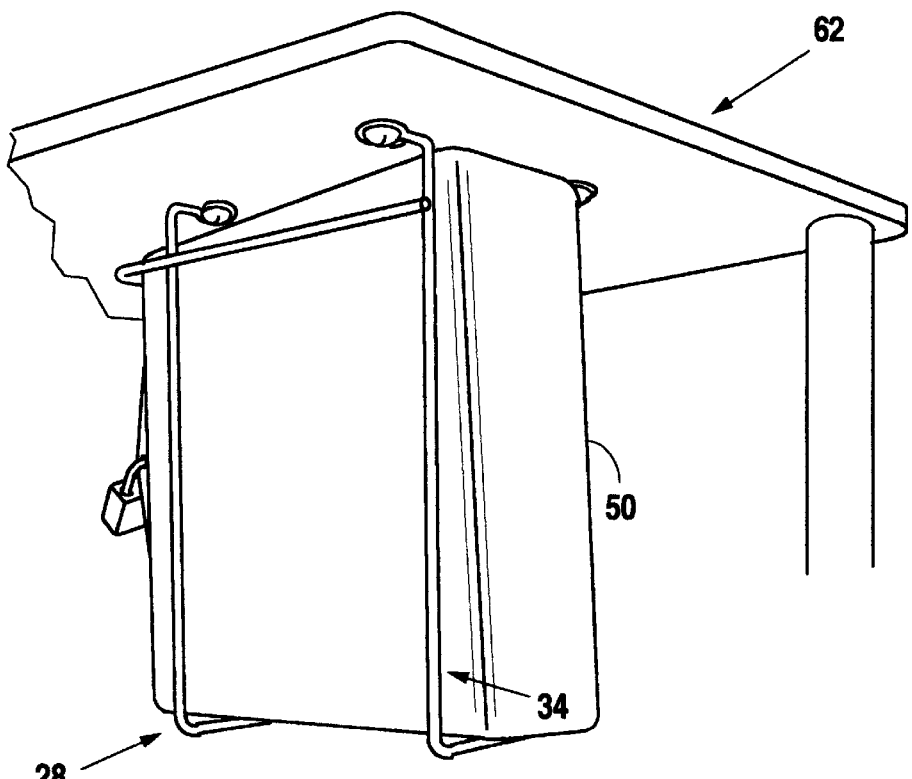
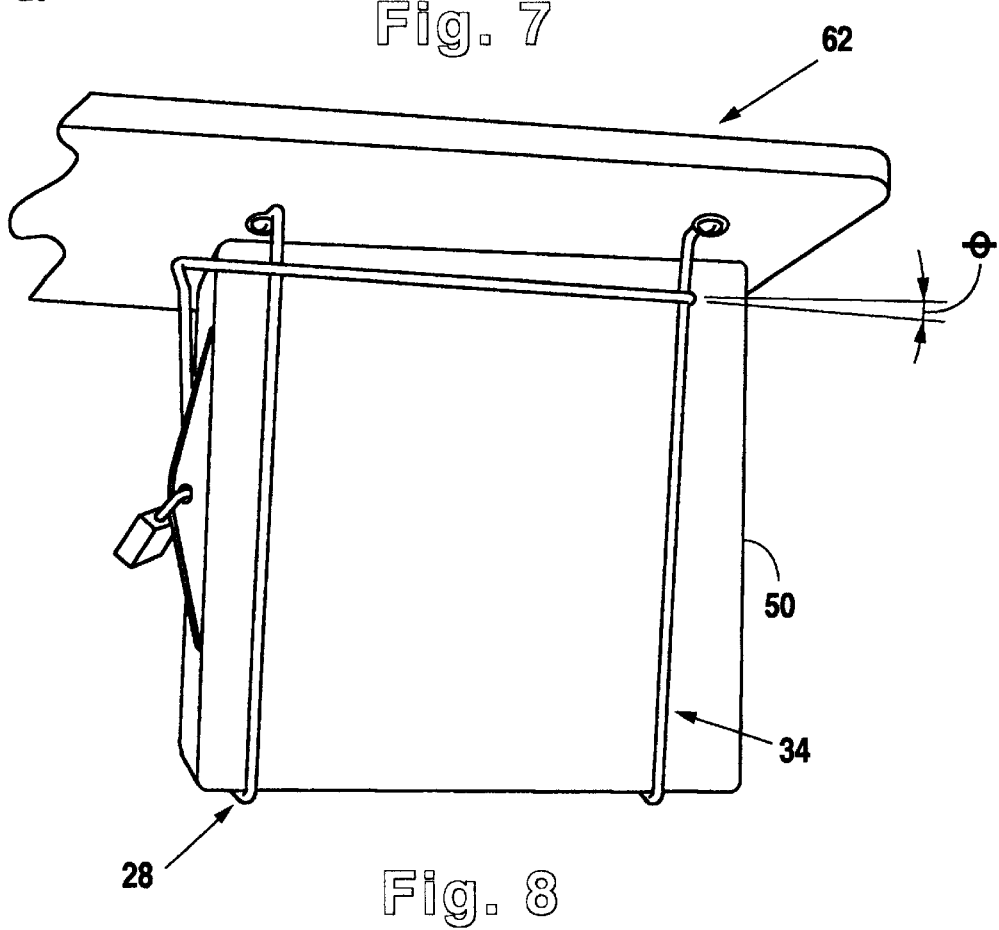

HANGING SUPPORT BASKET FOR COMPUTERS

BACKGROUND

The disclosures herein relate generally to computer systems and more particularly to a hanging basket for supporting a computer from the underside of a support surface.

A desktop computer comprises three major components which include the main computer chassis, a monitor and a keyboard. Typically, the main computer chassis is mounted on the desktop. The monitor is usually seated on the main computer chassis for the purpose of raising the monitor to a more compatible eye-level height. The keyboard is placed on the desktop in front of the main computer chassis. In addition, a mouse is usually positioned on a mouse pad located adjacent the main computer chassis and keyboard on the desktop. All of these components take up a significant amount of space on the desktop.

In order to reduce the amount of desktop space required by the footprint of the computer chassis, the chassis has been mounted on one end, in an upright position. This has been done on the desktop and on the floor under the desk. When placed on the floor, the computer chassis is exposed to a new and problem prone environment. The floor-mounted chassis is very susceptible to picking up unwanted dirt and debris. Also, the chassis is often bumped or jarred by being accidentally kicked by computer users or by cleaning crews and the equipment used for cleaning the surrounding floor areas. In addition to being accidentally abused, floor mounted computer chassis are intentionally misused as foot rests and even as support for storing other objects.

Computer stands have been developed which can support a computer chassis and/or monitor on the desktop and for supporting the computer chassis on the floor. These stands, however, do not always solve the desktop space problem and do not eliminate the problems associated with floor mounted chassis. Also, no security methods or devices are typically offered with such stands to deter theft or vandalism.

One approach to providing a desktop computer stand is described in U.S. Pat. No. 4,943,019. This device comprises a support frame for supporting a computer and its accessories comprising a base frame assembly and an upper frame assembly, each having two side rails and two end rails defining a respective peripheral frame, retaining means on each peripheral frame to retain a computer or a computer accessory against being dislodged when supported by the base or upper frame assembly, and two carry handle assemblies which join the rails of the base frame and upper frame assemblies and retain them horizontal, each handle assembly having a handle which extends outwardly away from sides of both the base and upper frame assemblies.

Therefore, what is needed is a support for a computer chassis that removes the chassis from the desktop and the floor environments and also provides a security feature to deter theft and/or vandalism.

SUMMARY

One embodiment, accordingly, provides a support for a computer chassis which is mounted to the underside of a support such as a work station or desktop so as to remove the computer from the desktop and floor environments. To this end, a computer support includes a frame for supporting a computer chassis, a mounting portion attached to the frame for mounting the frame in a suspended position to a support surface, and means for securing the frame to the computer chassis.

A principal advantage of this embodiment is that the computer chassis is removed from the desktop and floor environments but is supported at the work station near the monitor and keyboard, and is also secured to the support to deter theft and vandalism.

BRIEF DESCRIPTION OF THE DRAWINGS

FIG. 3 is a side view illustrating the support frame of FIG. 2.

FIG. 4 is a frontal view illustrating the support frame of FIG. 2.

FIG. 5 is a top view illustrating the support frame of FIG. 2.

FIG. 7 is an isometric view illustrating an embodiment of a computer chassis mounted in a support frame suspended from a workstation.

FIG. 8 is a side view of the computer chassis of FIG. 7.

DETAILED DESCRIPTION OF THE PREFERRED EMBODIMENT

Figure 1:
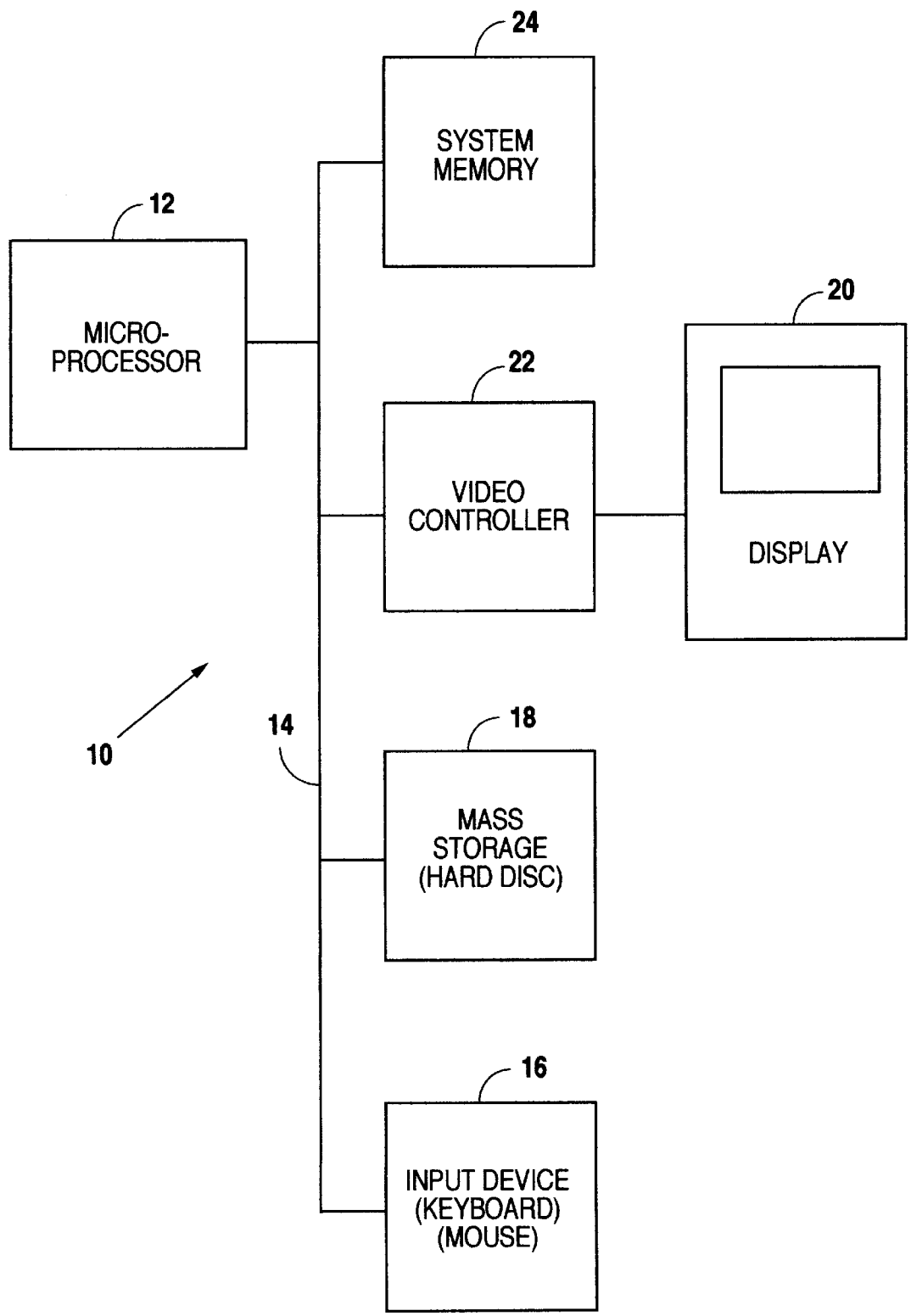
FIG. 1 is a diagrammatic view illustrating an embodiment of a computer system.

In one embodiment, computer system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
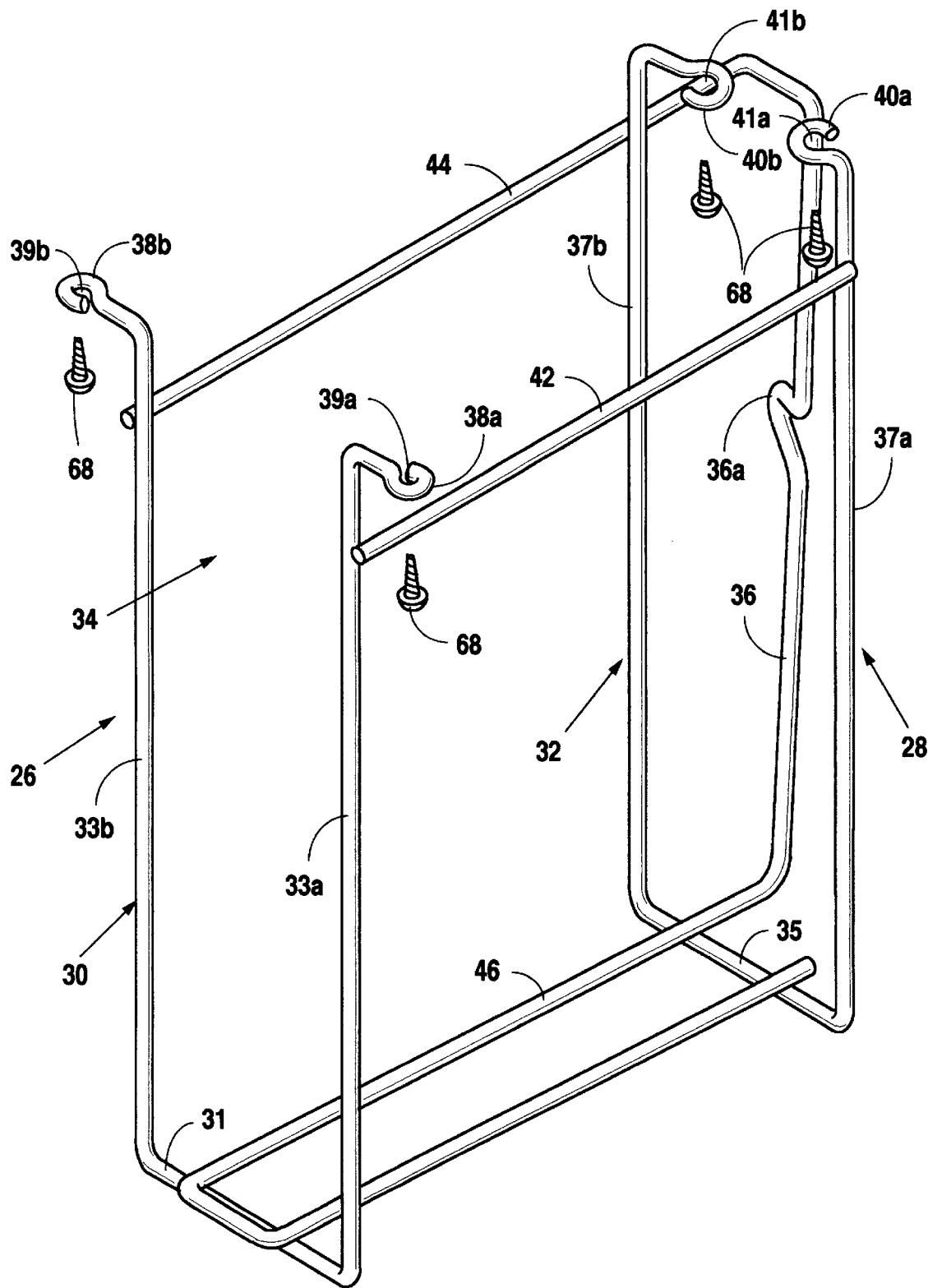
FIG. 2 is an isometric view illustrating an embodiment of a computer chassis support frame.

A computer chassis support 26, FIG. 2, comprises a frame 28 which includes a mounting portion having a first main support 30 and a second main support 32. Main support member 30 is generally U-shaped including a base member 31 and a pair of side members 33a, 33b. Main support 30 is adjacent an opening 34 and has a first length L1, FIGS. 3 and 4. Main support 32, FIG. 2, is generally U-shaped and includes a base member 35 and a pair of side members 37a, 37b and is positioned adjacent a back support 36 (discussed below) and has a second length L2, FIGS. 3 and 4, greater than first length L1.

Main support 30 FIGS. 2–4 includes a pair of attachment feet 38a, 38b, each being at a terminal end of side members 33a, 33b, respectively. The attachment feet 38a, 38b extend outwardly from the U-shaped support 30 at about a 90° angle relative to the side members 33a, 33b. Each of the attachment feet 38a, 38b include a fastener loop 39a, 39b, respectively, formed therewith. Main support 32 includes a pair of attachment feet 40a, 40b, each being at a terminal end of side members 37a, 37b, respectively. The attachment feet 40a, 40b, extend inwardly toward the U-shaped support 32 at about a 90° angle relative to the side members 37a, 37b. Each of the attachment feet 40a, 40b, include a fastener loop 41a, 41b, respectively, formed therewith.

Frame 28, FIG. 2, also includes a first reinforcing support 42 and a second reinforcing support 44. First reinforcing support 42 interconnects side members 33a and 37a. Second reinforcing support 44 interconnects side members 33b and 37b. Second reinforcing support 44 also extends to form a back support 36 and extends further to form a bottom support 46 which interconnects base members 31 and 35. Back support 36 comprises a security portion including a U-shaped security loop 36a formed therein.

Figure 6:
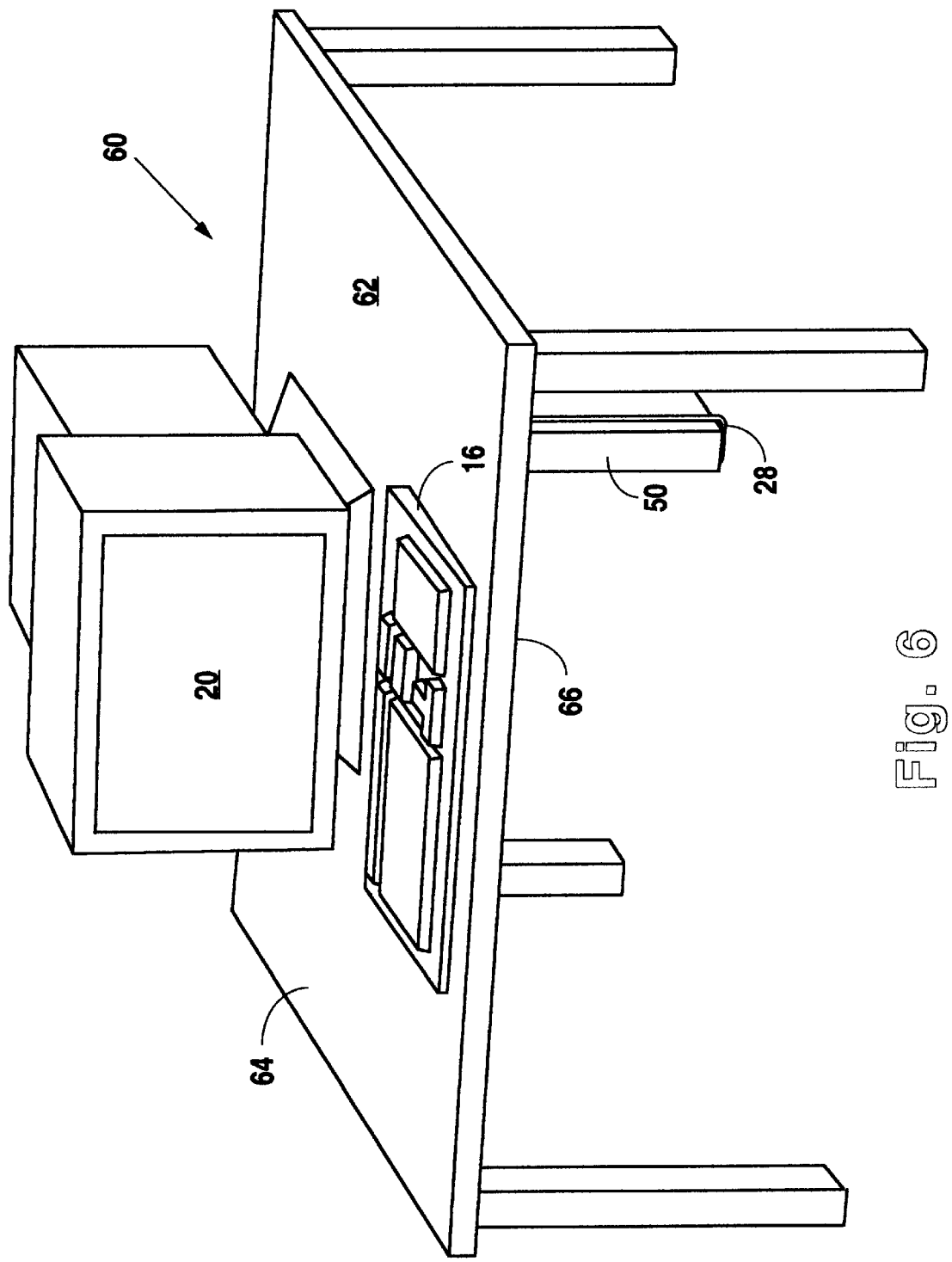
FIG. 6 is an isometric view illustrating an embodiment of a computer system mounted at a user station.
Figure 9:
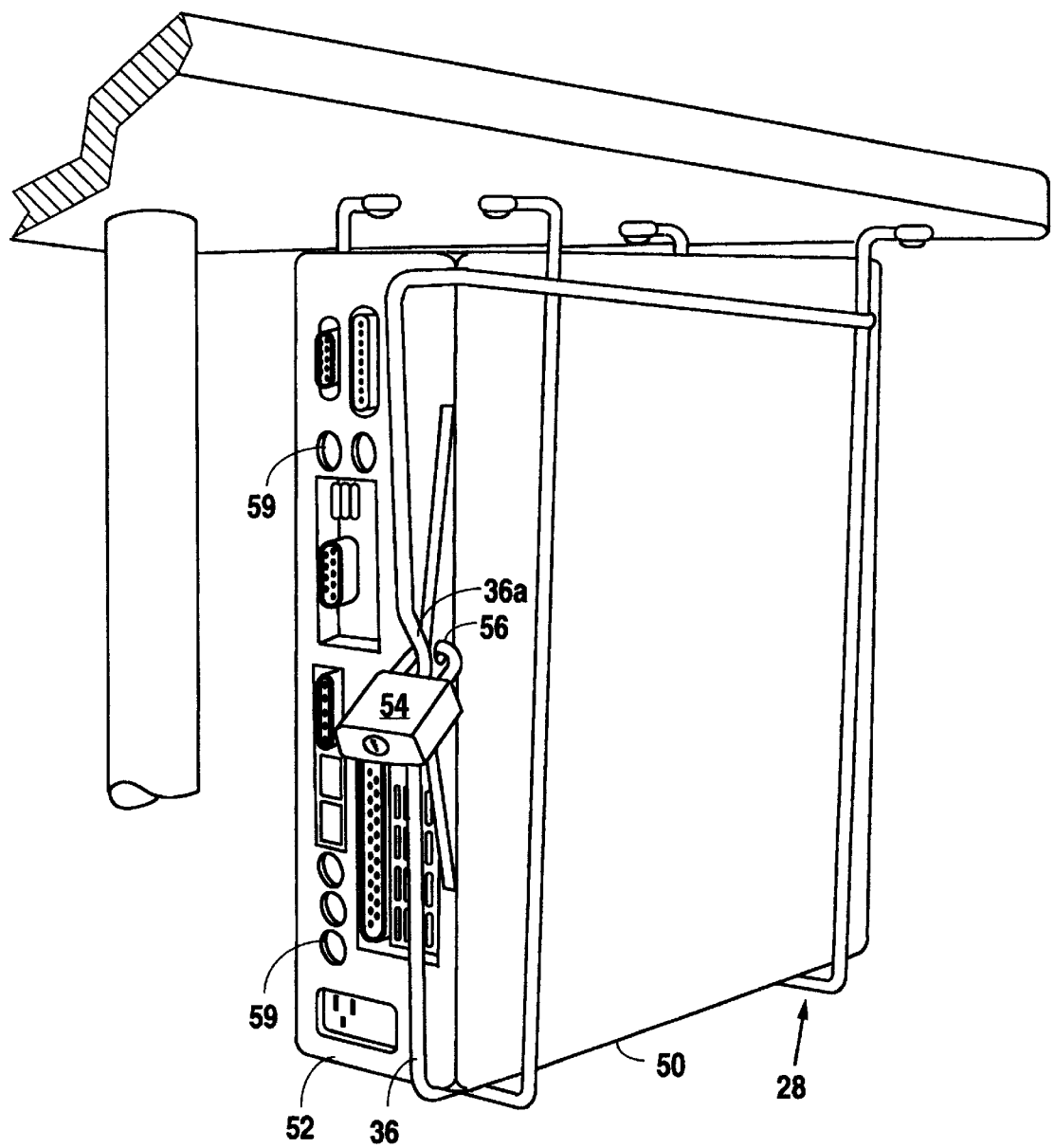
FIG. 9 is another isometric view of the computer chassis of FIG. 7.

A computer user station 60, FIG. 6, includes a desk or table 62 including a first surface 64 supporting display or monitor 20, and input device or keyboard 16. Frame 28 is mounted to a second or underside surface 66 of table 62 for supporting a computer chassis 50. Attachment of frame 28 to surface 66 is accomplished by using standard fasteners such as screws 68, or the like, which are inserted through fastener loops 41a, 41b and 39a, 39b, see FIG. 2. With frame 28 secured to user station 60 as described, the longer length L2 of main support member 32, FIG. 3, causes bottom support 46 to slant downwardly from main support member 30 at a slight angle θ Computer chassis 50 is inserted into open end 34 of frame 28, FIG. 7, and rests in frame 28 at angle θ tilted away from open end 34, FIG. 8. A back 52 of chassis 50, including port connections 59, rests against back support 36, FIG. 9. A padlock 54 is inserted through security loop 36a and through a chassis padlock loop opening 56 in chassis 50, thus securing chassis 50 to frame 28. Due to the position of the inwardly turned attachment feet 40a, 40b, FIG. 2, it can be appreciated that it would be difficult to insert and align a tool to access and remove screws 68 from frame 28 when computer chassis 50 is mounted therein.

In operation, standard fasteners are used, e.g. screws, to secure the attachment feet to the underside of the support surface such as the workstation desk or table. The computer chassis is inserted into the opening of the frame and rests therein in a tilted back position so that the chassis back surface, including the port connections, is engaged with the back support of the frame. This positions the chassis padlock loop adjacent the security portion of the back support. The padlock is used to attach the computer chassis to the frame.

Removal of the padlock permits the computer chassis to be removed from the frame. Also, the fasteners can be removed to separate the frame from the support surface only after the chassis is removed. This is because some of the fastener loops of the attachment feet are positioned such that they are substantially inaccessible for alignment by a tool, e.g. as a screwdriver or the like, when the computer chassis is secured in the frame.

As it can be seen, the principal advantages of these embodiments are that the computer support frame removes the computer chassis from the desktop and from the floor while storing the chassis at the user station conveniently close to the monitor and keyboard. Having the chassis removed from the desktop provides more available desktop work surface because the footprint of the chassis is substantially greater than the footprint of either the monitor or the keyboard.

Having the chassis removed from the floor removes the chassis from the dirt and debris of the floor environment. Also, removal of the chassis from the floor will avoid exposing the chassis to being inadvertently kicked or bumped by people or cleaning equipment, and will avoid exposing the chassis to intentional misuse as a footrest or a storage shelf.

Another advantage is that the chassis sits in the computer support frame at an angle so that the chassis is tilted away from the opening in the frame. This limits the possibility that the chassis can or will be able to slide out of the frame. The support frame, being open to airflow, does not impede the flow of cooling air around and through the computer chassis.

A further advantage is that the computer chassis can be secured to the frame by a padlock or the like. Furthermore, the attachment feet are located on the frame in such a way that, when the computer chassis is mounted in the frame, it is extremely difficult to access the fasteners which secure the frame to the support surface to which it is attached.

As a result, one embodiment provides a computer support which comprises a frame for supporting a computer chassis. The frame includes a mounting portion attached thereto for mounting the frame in a suspended position from a support surface such as the underside of a desk or the like. The frame also includes a security portion for securing the frame to the computer chassis.

Another embodiment provides a computer system comprising a chassis, a microprocessor in the chassis, an input coupled to provide input to the microprocessor, a mass storage coupled to the microprocessor in the chassis, a display coupled to the microprocessor by a video controller, and a memory coupled to provide storage to facilitate execution of computer programs by the microprocessor in the chassis. A frame is provided for supporting the computer chassis. The frame includes a mounting portion attached thereto for mounting the frame to the support surface in a suspended position. The frame also includes a security portion for securing the frame to the computer chassis.

A further embodiment provides a computer user station comprising a support member, a monitor and a keyboard supported on a first surface of the support member, a computer chassis, and a frame supporting the computer chassis. The frame includes a mounting portion attached thereto for mounting the frame to a second surface of the support member in a suspended position. The frame also includes a security portion for securing the frame to the computer chassis.

An even further embodiment provides a method of supporting a computer chassis at a user station. A plurality of reinforcing ribs are attached to a plurality of main supports to form a frame. A plurality of attachment feet are formed on the frame. A security portion is formed on the frame. The attachment feet are attached to suspend the frame from the user station. A computer chassis is then inserted into the frame so that a surface of the computer chassis is adjacent the security portion for subsequent attachment thereto.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computer support comprising:
  a frame for supporting a computer chassis, the frame including a plurality of interconnected members defining an interior cavity and an opening for passing the computer chassis into the interior cavity, a back support, a mounting portion including a plurality of attachment feet, and spaced apart base members;

the back support including means for securing the frame to the computer chassis;

the base members defining a support tilted downward from the opening to the back support;

the attachment feet including a first set of feet extending outwardly from the opening; and the attachment feet including a second set of feet extending inwardly toward one another and located at an upper portion of the interior cavity.

2. The computer support as defined in claim 1 wherein the frame is formed of a plurality of main supports and a plurality of reinforcing supports attached to the main supports.

3. The computer support as defined in claim 2 wherein a first one of the main supports is of a first length and a second one of the main supports is of a second length, greater than the first length.

4. The computer support as defined in claim 2 wherein the attachment feet are angularly disposed relative to the main supports.

5. The computer support as defined in claim 2 wherein the attachment feet each define a fastener loop.

6. A computer system comprising:

a computer chassis;

a microprocessor in the chassis;

an input coupled to provide input to the microprocessor;

a mass storage coupled to the microprocessor in the chassis;

a display coupled to the microprocessor by a video controller;

a memory coupled to provide storage to facilitate execution of computer programs by the microprocessor in the chassis;

a frame supporting the computer chassis, the frame including a plurality of interconnected members defining an interior cavity and an opening for passing the computer chassis into the interior cavity, a back support, a mounting portion including a plurality of attachment feet, and spaced apart base members;

the back support including means for securing the frame to the computer chassis;

the base members defining a support tilted downward from the opening to the back support;

the attachment feet including a first set of feet extending outwardly from the opening; and the attachment feet including a second set of feet extending inwardly toward one another and located at an upper portion of the interior cavity.

7. The computer system as defined in claim 6 wherein the frame is formed of a plurality of bent steel rods having a pair of main supports and a plurality of reinforcing supports attached to the main supports.

8. The computer system as defined in claim 7 wherein the attachment feet are angularly disposed relative the main supports.

9. The computer system as defined in claim 7 wherein the attachment feet each define a fastener loop.

10. The computer system as defined in claim 7 wherein at least one of the reinforcing supports includes the back support.

11. A computer user station comprising:

a support member;

a monitor and a keyboard supported on a first surface of the support member;

a computer chassis;

a frame supporting the computer chassis, the frame including a plurality of interconnected members defining an interior cavity and an opening for passing the computer chassis into the interior cavity, a back support, a mounting portion including a plurality of attachment feet, and spaced apart base members;

the back support including means for securing the frame to the computer chassis;

the base members defining a support tilted downward from the opening to the back support;

the attachment feet including a first set of feet extending outwardly from the opening; and the attachment feet including a second set of feet extending inwardly toward one another and located at an upper portion of the interior cavity.

12. The computer user station as defined in claim 11 wherein the frame is formed of a plurality of main supports and a plurality of reinforcing supports, a first one of the main supports is of a first length and a second one of the main supports is of a second length, greater than the first length, whereby the frame supports the chassis in a tilted position.

13. The computer user station as defined in claim 12 wherein the reinforcing support includes the back support, and wherein the chassis rests against the back support.

* * * * *